United States Patent [19]
Tanaka et al.

[11] Patent Number: 5,339,318
[45] Date of Patent: Aug. 16, 1994

[54] VPI AND VCI ASSIGNMENT SYSTEM IN ATM SYSTEM

[75] Inventors: Kenji Tanaka; Susumu Eda; Katsumi Oomuro; Ryuji Hyodo; Osamu Sekihata; Hiroyuki Hatta; Reiko Norizuki, all of Kawasaki, Japan

[73] Assignee: Fujitsu Limited, Kawasaki, Japan

[21] Appl. No.: 964,924

[22] Filed: Oct. 22, 1992

[30] Foreign Application Priority Data

Oct. 24, 1991 [JP] Japan .................. 3-277543

[51] Int. Cl.⁵ ............................. H04J 3/12
[52] U.S. Cl. ..................... 370/110.1; 370/58.2
[58] Field of Search ............. 370/110.1, 94.1, 60, 370/58.1, 58.2, 58.3, 60.1

[56] References Cited

U.S. PATENT DOCUMENTS

| | | | |
|---|---|---|---|
| 5,051,982 | 9/1991 | Brown et al. | 370/110.1 |
| 5,067,123 | 11/1991 | Hyodo et al. | 370/58.2 |
| 5,084,867 | 1/1992 | Tachibana et al. | 370/60 |

Primary Examiner—Douglas W. Olms
Assistant Examiner—Shick Hom

[57] ABSTRACT

In a VPI and VCI assignment system in an ATM system having a plurality of nodes and terminals, each of the nodes including a conversion unit which generates ATM cells from data sent from one of the terminals, and a node management unit which manages a corresponding one of the nodes, a management unit assigns VPIs and VCIs to calls and manages information concerning VPIs and VCIs currently assigned to the calls and idle VPIs and VCIs. An assignment requesting unit, which is provided in each of the nodes and connected to the management unit, requests the management unit to assign a VPI and a VCI to a call received from one of the terminals. An assignment cancelling unit, which is provided in each of the nodes and connected to the management unit, requests the management unit to cancel the VPI and VCI assigned to the call in response to an end of a communication related to the call.

15 Claims, 19 Drawing Sheets

VPI AND VCI ASSIGNMENT SYSTEM IN ATM SYSTEM

BACKGROUND OF THE INVENTION

1. Field of the Invention

The present invention generally relates to a VPI (Virtual Path Identifier) and VCI (Virtual Channel Identifier) assignment system in an ATM (Asynchronous Transfer Mode) system.

2. Description of the Prior Art

Recently, there has been considerable activity in the development of an ATM system capable of realizing a B-ISDN (Broadband-Integrated Services Digital Network). In the ATM system, all digital information is converted into cells (ATM cells), each having a fixed data length, and cells are transferred via a transmission medium. Each cell consists of a 5-byte header, and a 48-byte information field, and hence consists of 53 octets. The header includes identifiers VPI and VCI. A logical path and a logical channel, via which each cell is transferred, are identified from the VPI and VCI contained in each cell, and switching in nodes, such as exchanges and transmission devices, are controlled so that the identified logical paths and channels can be obtained. The CCITT Recommendations define the number of bits included in the ATM cell header, the above bits being used for representing the VPI and VCI (see CCITT Recommendations I. 361 and 363). Hence, the number of usable paths (VPI) and the number of usable channels (VCI) are respectively limited. Hence, a sufficient number of usable paths and a sufficient number of usable channels cannot be obtained in order to transfer a large amount of data via a route having high traffic.

FIG. 1 is a block diagram for explaining the VPI and VCI in an ATM system, and FIG. 2 is a block diagram of a node provided in the ATM system. FIG. 1 shows a plurality of nodes #1, #2 and #3, which are connected to each other via high-bit-rate digital lines (dedicated lines). VPI#1 indicates a path in a route extending from node #1 to node #3 via node #2 serving as a relay node. Two channels VCI#1 and VCI#2 are provided in the path VPI#1. A path VPI#2 is provided as a path in a route extending from node #1 to node #2. Three channels VCI#3, VCI#4 and VCI#5 are provided in the path VPI#2. It will be noted that the paths VPI#1 and VIP#2 correspond to a single physical transmission line or to several different transmission lines.

Referring to FIG. 2, a terminal 150, such as a telephone set or a data terminal, and a modem (modulator/demodulator) 151 are connected to a node 152. The node 152 comprises a node management unit 153, conversion (cell assembly/disassembly) units 154 and 155, a route switching unit 156, a control bus 157, and a data bus 158. If the terminal 150 generates a call and specifies a remote destination terminal, necessary information is transferred from the terminal 150 to the node management unit 153 via the conversion unit 154 and the control bus 157. The node management unit 153 determines whether or not a VPI and a VCI for making a communication route connected to the destination terminal have already been assigned to the terminal 150. If such a pair of VPI and VCI has been assigned to the terminal 150, the node management unit 153 informs the conversion unit 154 of the result of the above determination. If it is determined that such a pair of VPI and VCI has not yet been assigned to the terminal 150, the node management unit 153 sends an VPI/VCI assignment request to a network management unit (not shown) provided in the ATM system. The conversion unit 154 assembles ATM cells from data transferred from the terminal 150, and the assigned VPI and VCI are written into each of the ATM cells.

The ATM cell header includes a 12-bit (for NNI: Network-Network Interface) or 8-bit (for UNI:User-Network Interface) VPI area, and a 16-bit VCI area, and further includes four bits for payload type and for setting priority and reservation, and eight bits for checking whether or not the ATM cell header has an error. The ATM cells are applied to the route switching unit 156 via the data bus 158. The route switching unit 156 discriminates the VPI and VCI included in each of the ATM cells, and outputs the ATM cells to a digital service unit (DSU) 160 in the corresponding route. Then, the ATM cells are transferred via a high-bit-rate digital line extending from the digital service unit 160.

In the conventional ATM system, the VPI and VCI used in the previous communications continue to be held in the node management unit 153 after the terminal 150 completes the communications. Hence, the terminal 150 can use the VPI and VCI previously assigned and held in the node management unit 153 when the terminal 150 generates a call. Calls from the modem 151 can be processed in the same manner as calls from the terminal 150.

The node management unit 153 is connected, via a digital service unit (DSU) 159, to a node management unit of another node and/or the aforementioned network management unit. The node management unit 153 sends requests to another node management unit and the network management units, and receives a VPI and a VCI assigned by another node.

However, the above-mentioned conventional VPI and VCI assignment system has the following disadvantages. The assigned VPIs and VCIs continue to be held after the communications are completed. Meanwhile, the number of paths and the number of channels are limited to $2^{12}$ ($=4096$)/$2^8$ (256) and $2^{16}$ ($=65536$), respectively. Hence, it is very difficult to transmit data via a route having high traffic by means of the limited number of paths and channels under the condition that the assigned VPIs and VCIs continue to be held after the communications are completed.

It is necessary to assign paths and channels to bypass routes beforehand rather than executing a process in which idle paths and channels are searched for and assigned in response to the detection of a fault that has occurred in the system. If a fault has occurred, a corresponding bypass route is immediately established. The bypass routes may be used when there is no idle channel. Normally, the paths and channels assigned to the bypass routes cannot be used. Hence, a number of paths smaller than 4096 (NNI cells)/256 (UNI cells) and a number of channels smaller than 65536 can be used in practice.

SUMMARY OF THE INVENTION

It is a general object of the present invention to provide a VPI/VCI assignment system in which the above disadvantages are eliminated.

A more specific object of the present invention to provide a VPI/VCI assignment system capable of efficiently utilizing a limited number of paths and channels and easily assigning a VPI and a VCI to a bypass route where necessary.

The above objects of the present invention are achieved by a VPI and VCI assignment system in an ATM system having a plurality of nodes and terminals, each of the nodes including a conversion unit which generates ATM cells from data sent from one of the terminals, and a node management unit which manages a corresponding one of the nodes, the VPI and VCI assignment system comprising: management means for assigning VPIs and VCIs to calls and managing information concerning VPIs and VCIs currently assigned to the calls and idle VPIs and VCIs; assignment requesting means, provided in each of the nodes and connected to the management means, for requesting the management means to assign a VPI and a VCI to a call received from one of the terminals; and assignment cancelling means, provided in each of the nodes and connected to the management means, for requesting the management means to cancel the VPI and VCI assigned to the call in response to an end of a communication related to the call.

BRIEF DESCRIPTION OF THE DRAWINGS

Other objects, features and advantages of the present invention will become more apparent from the following detailed description when read in conjunction with the accompanying drawings, in which.

Figure 1:
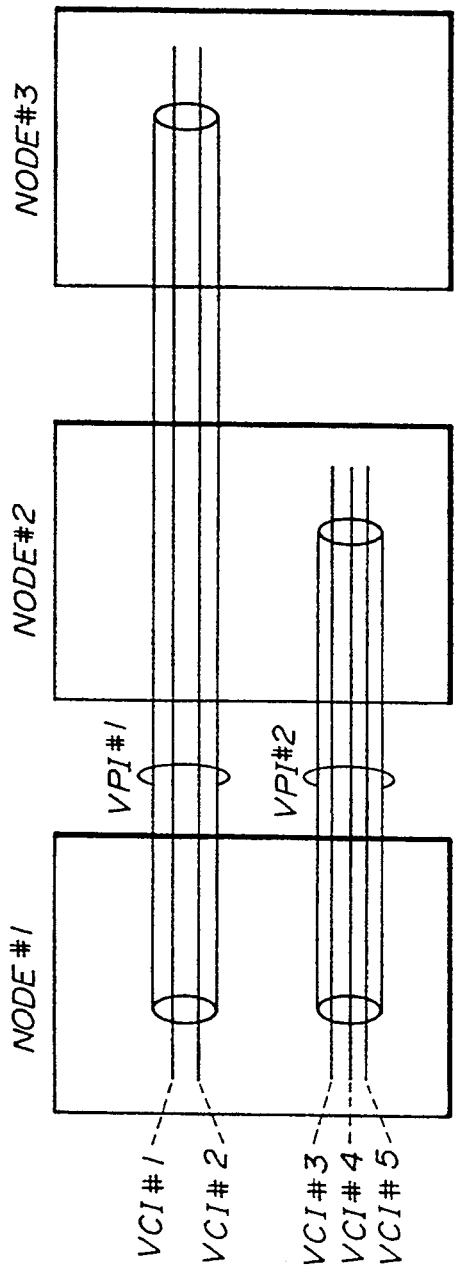
FIG. 1 is a block diagram for explaining a VPI and a VCI in an ATM system.
Figure 2:
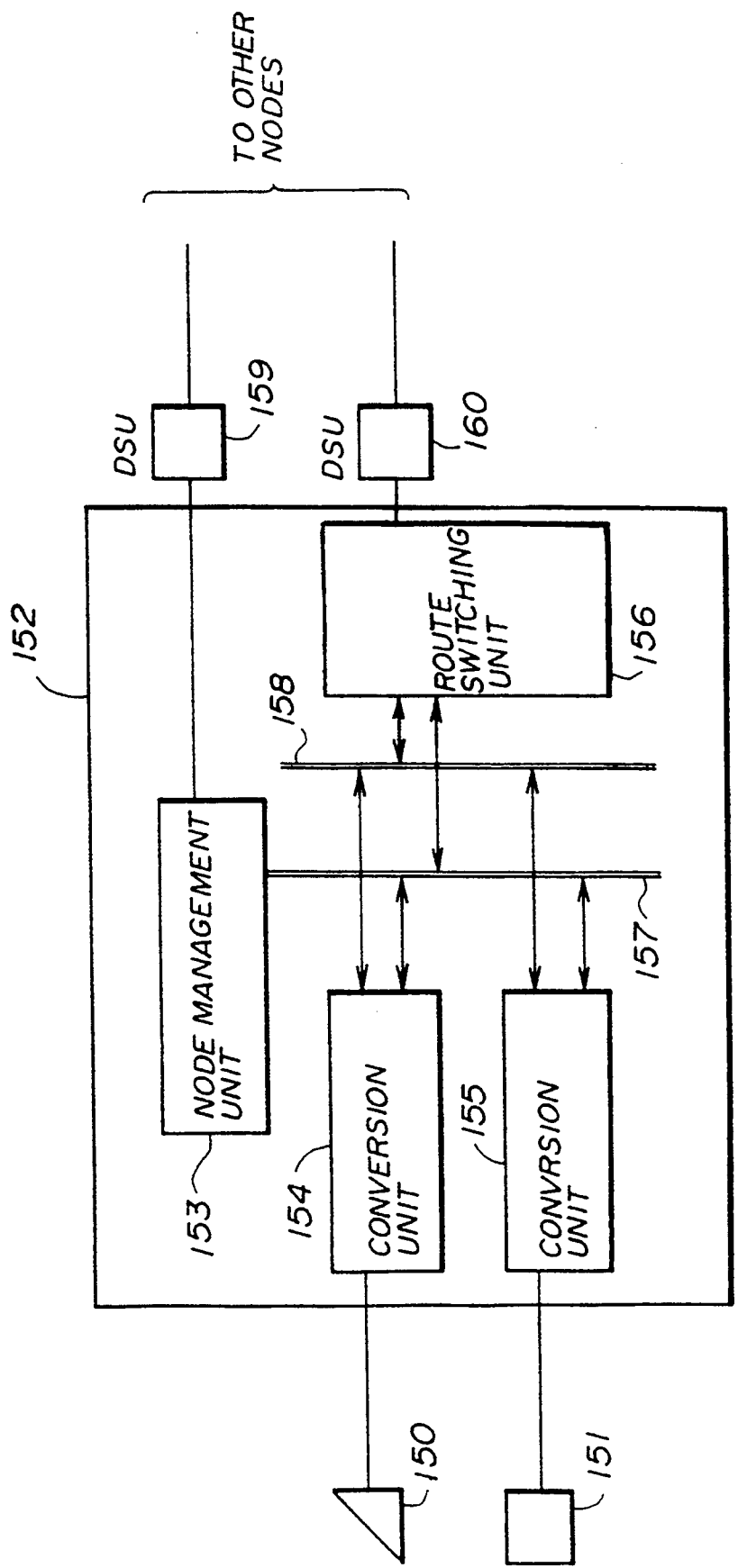
FIG. 2 is a block diagram of a node used in the ATM system shown in FIG. 1.
Figure 3:
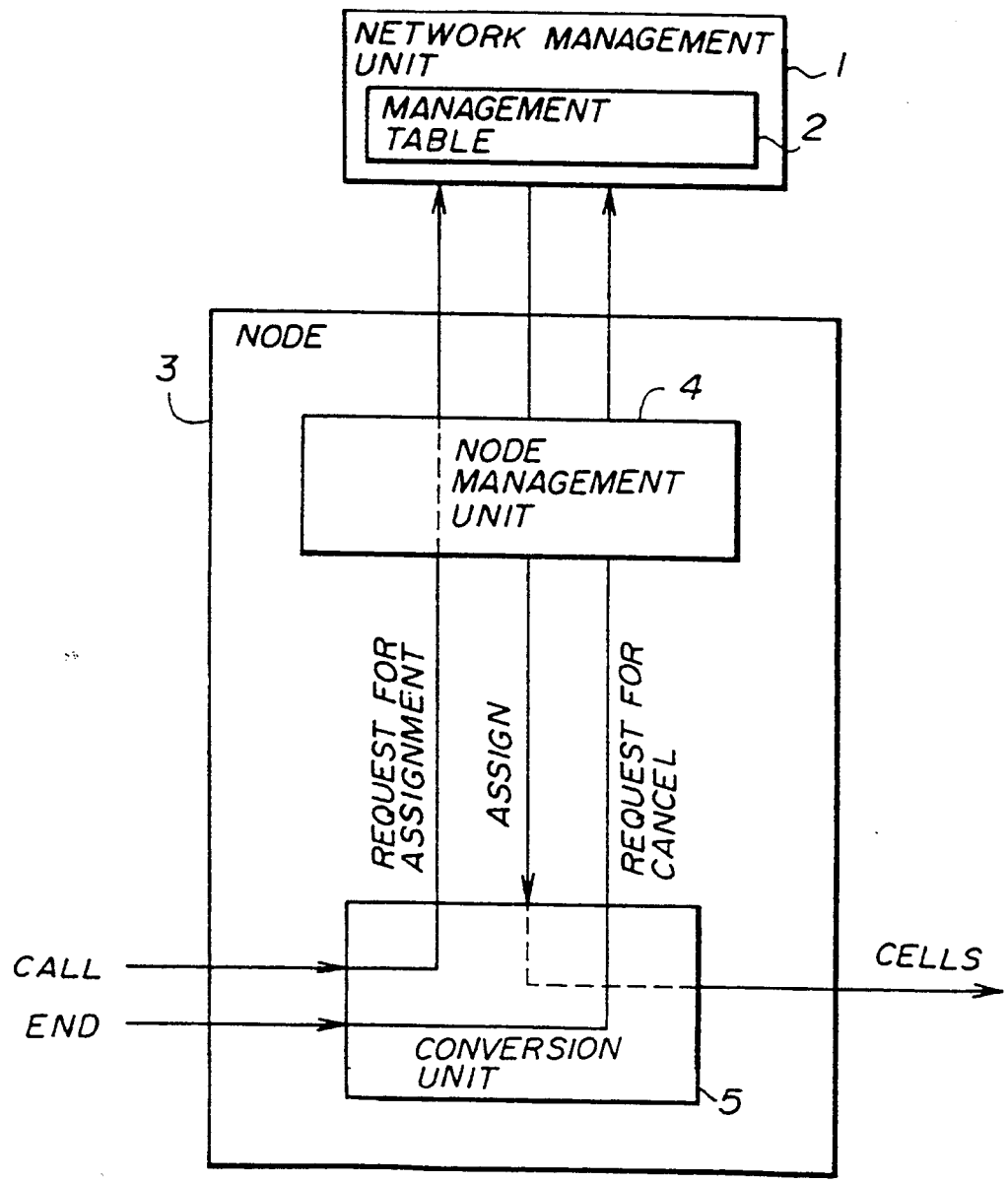
FIG. 3 is a block diagram illustrating an overview of a first embodiment of the present invention.
Figure 5:
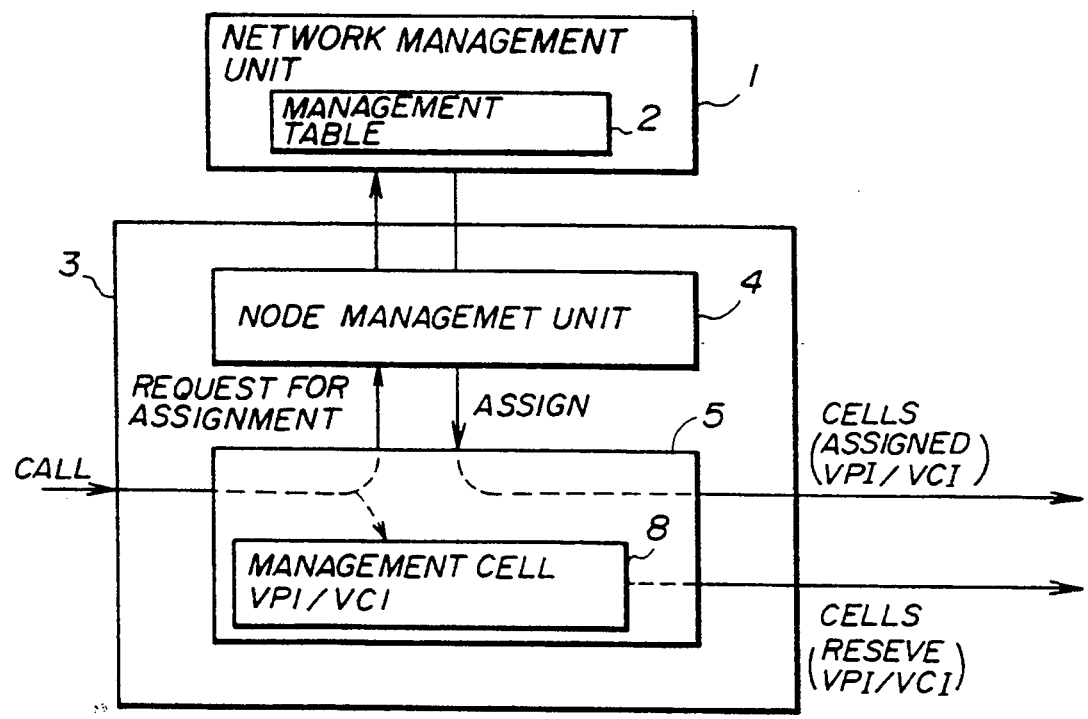
Figure 7:
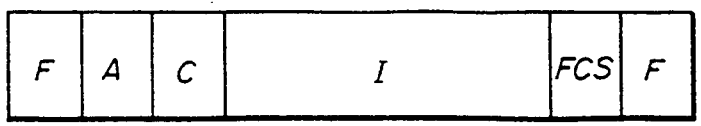
Figure 6:
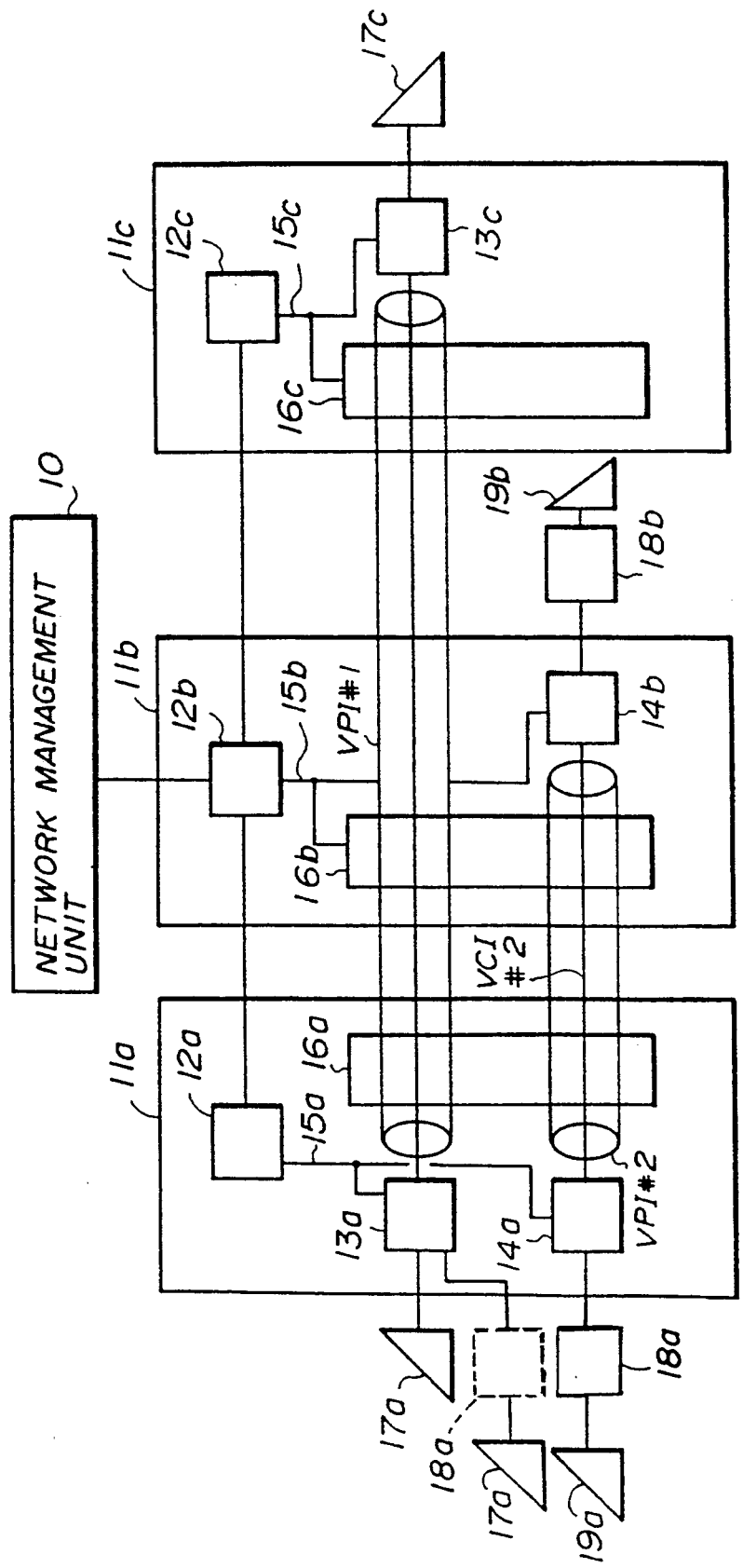
Figure 8:
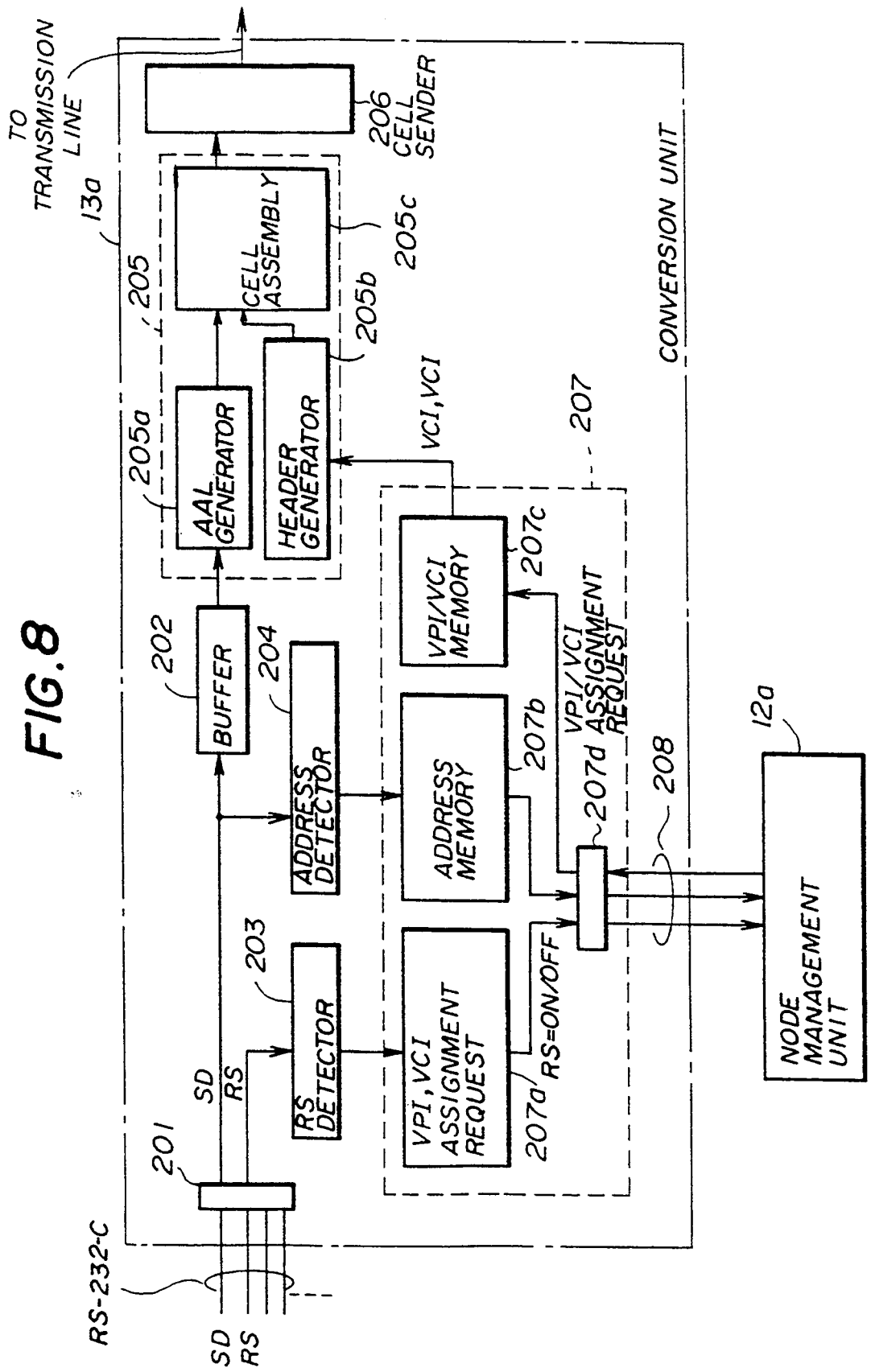
Figure 9:
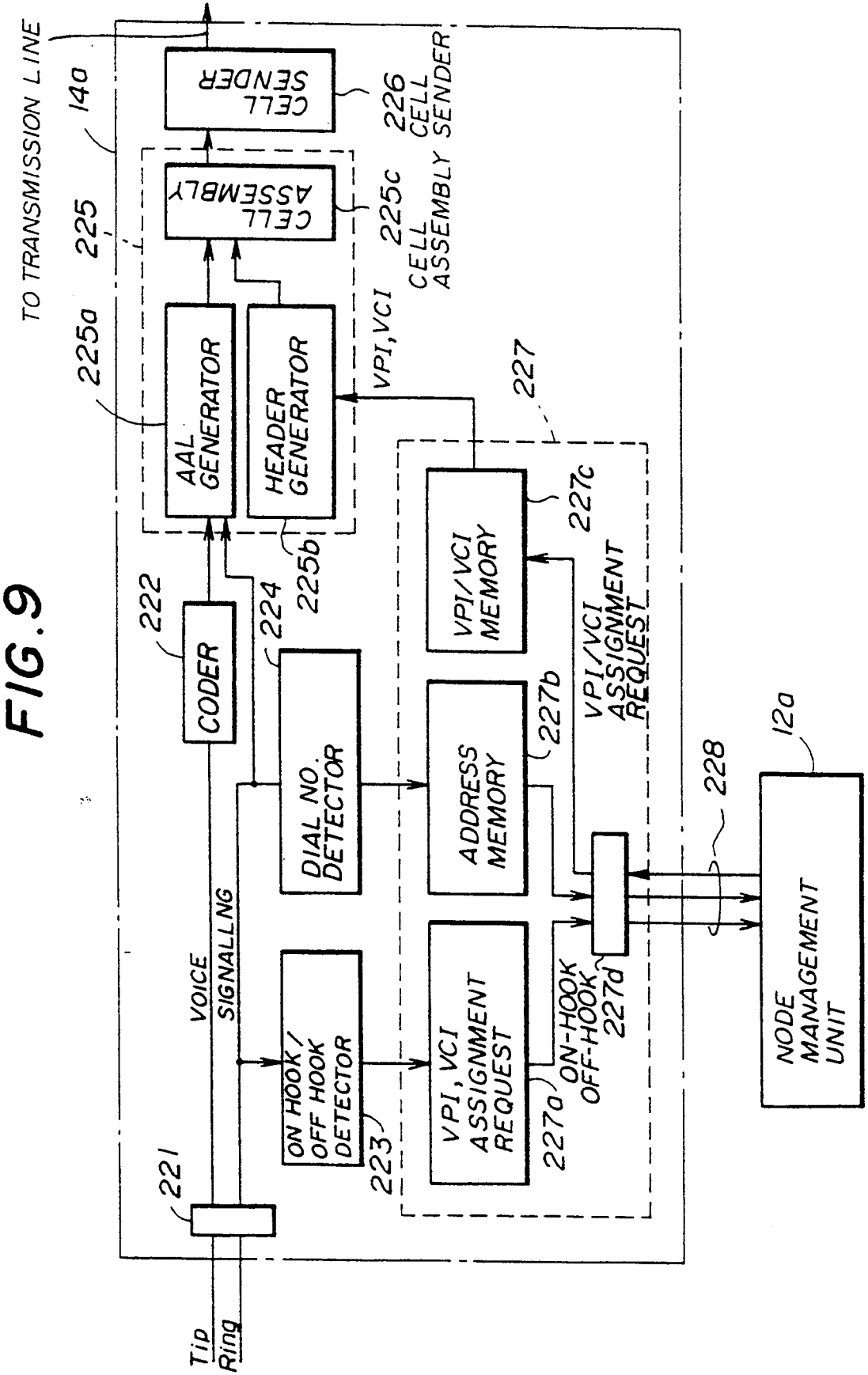
Figure 10:
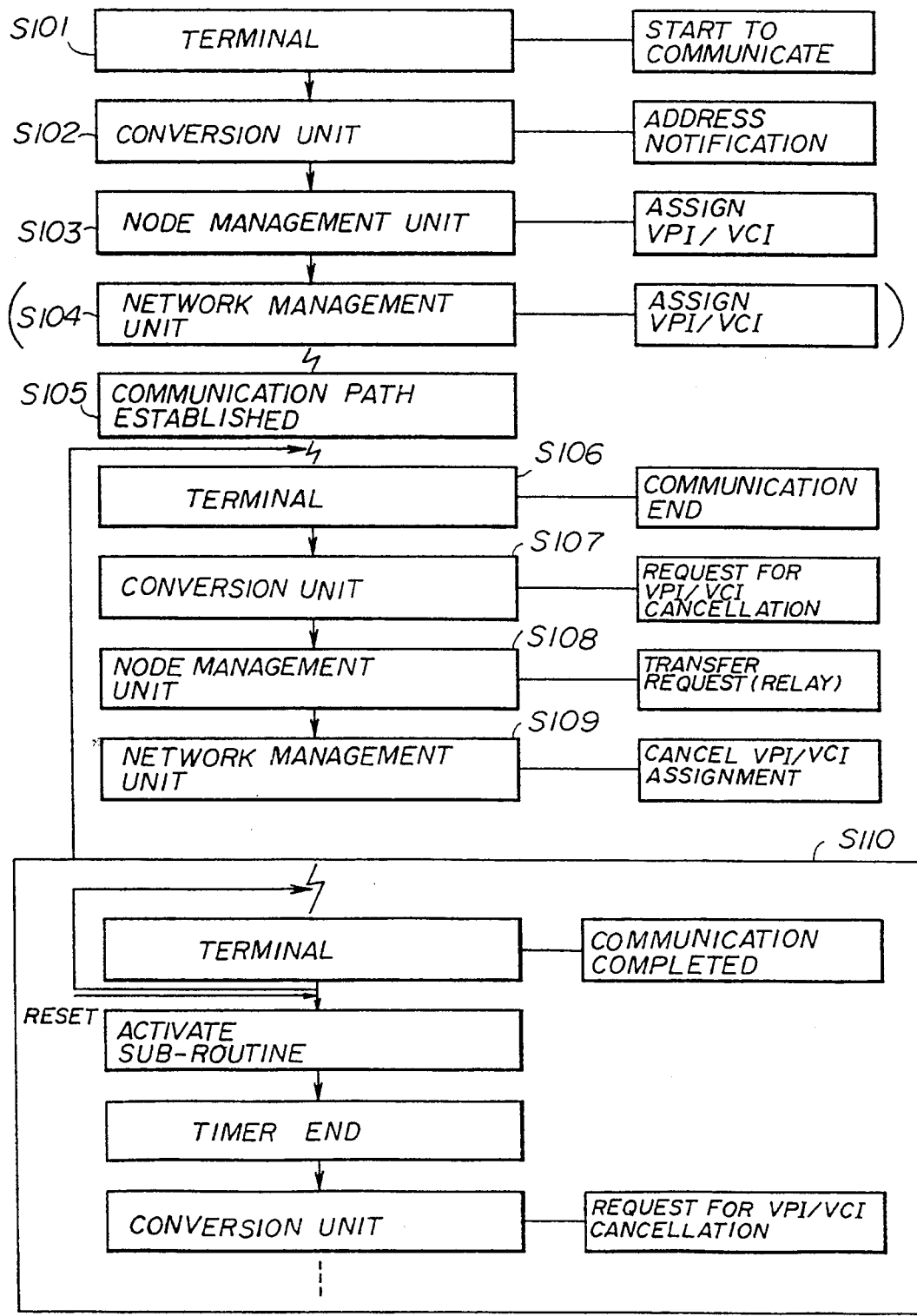
Figure 11:
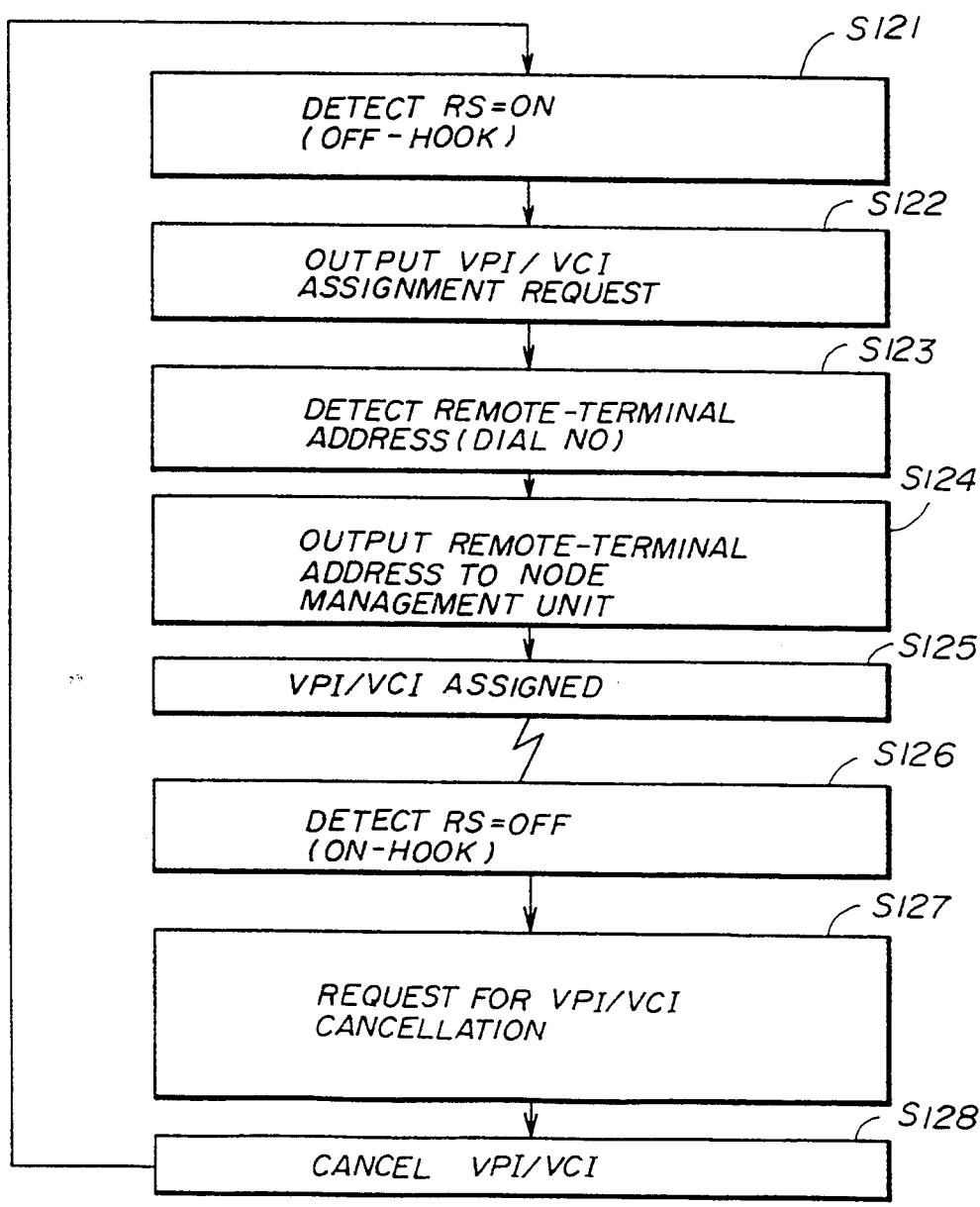
Figure 12:
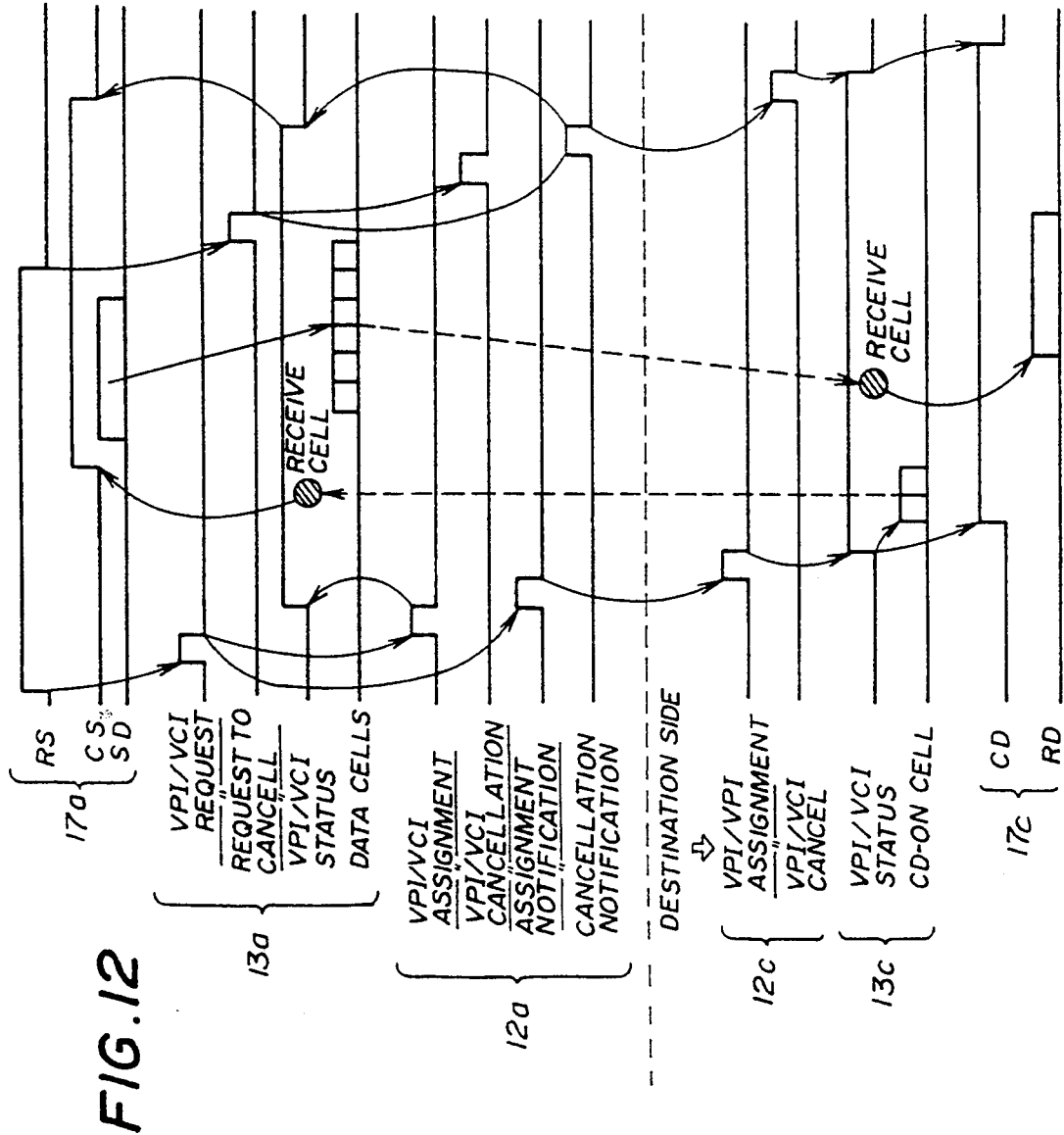
Figure 13:
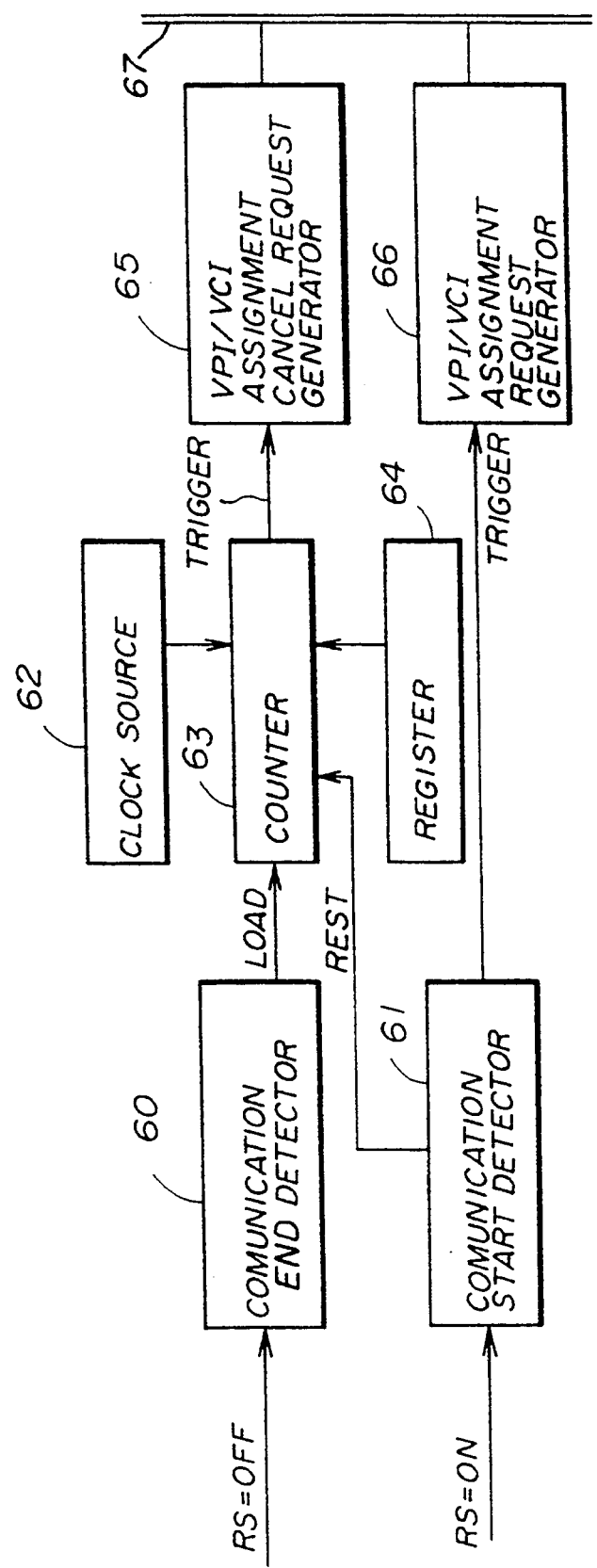
Figure 14:
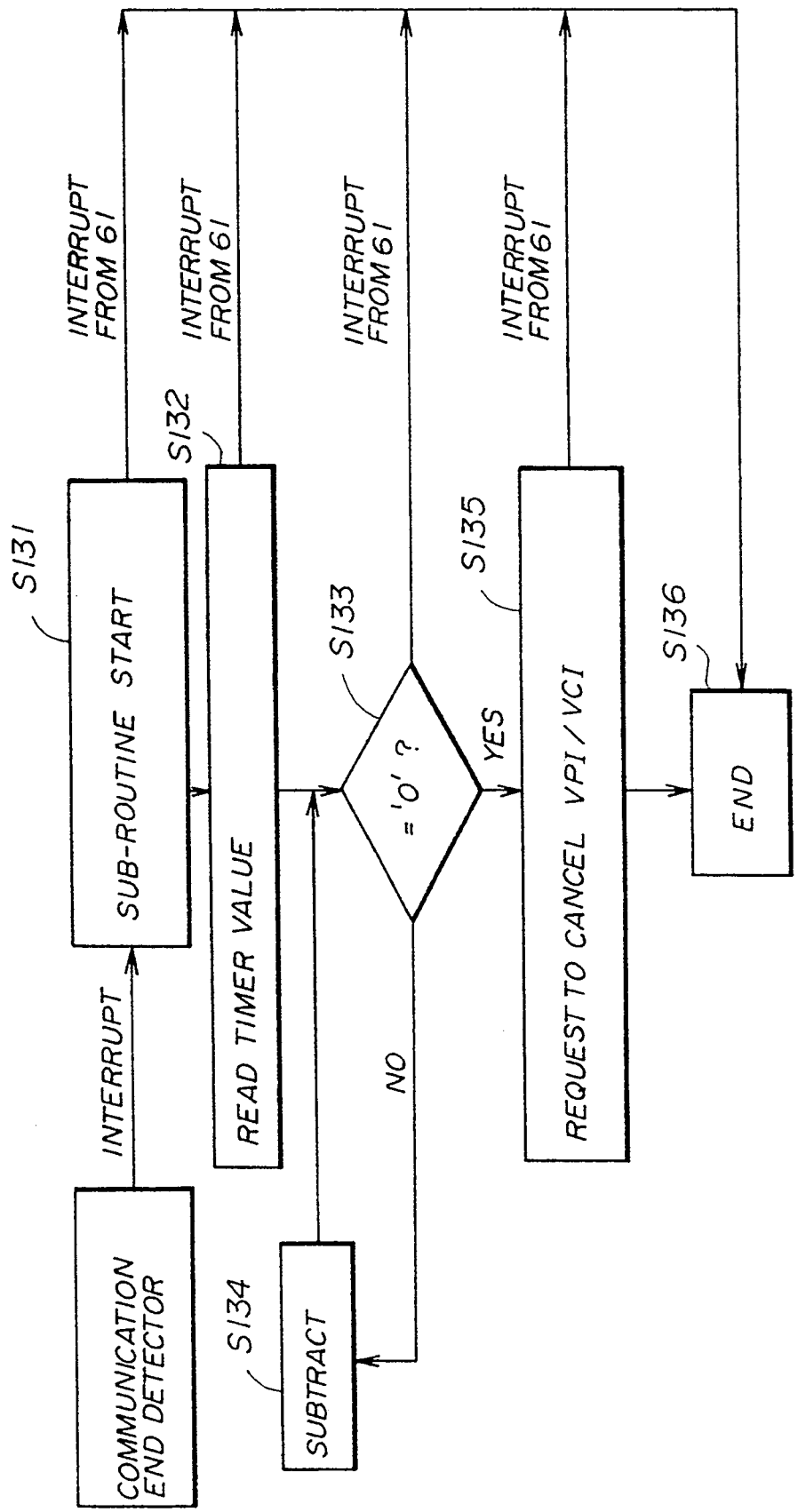
Figure 15:
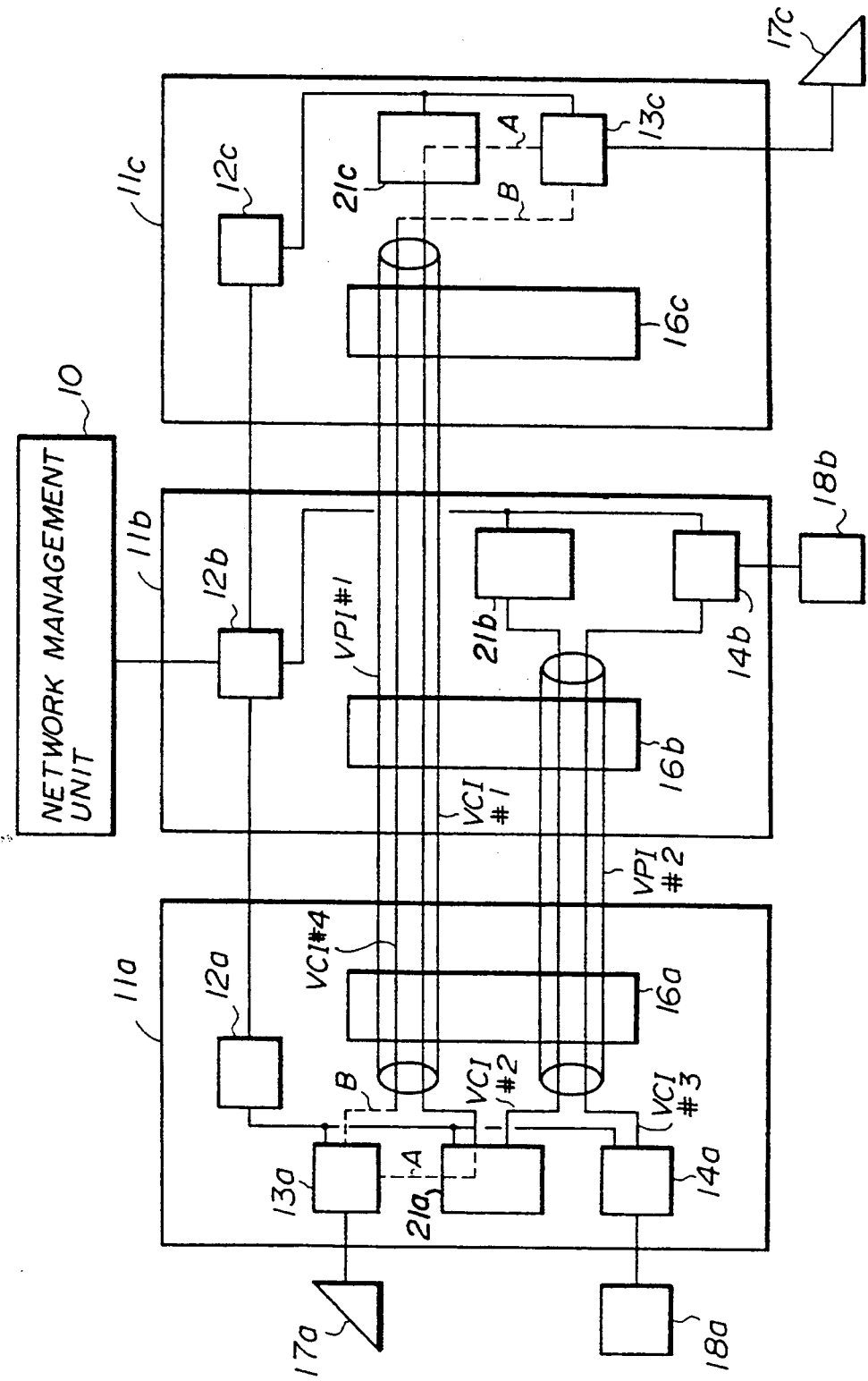
Figure 16:
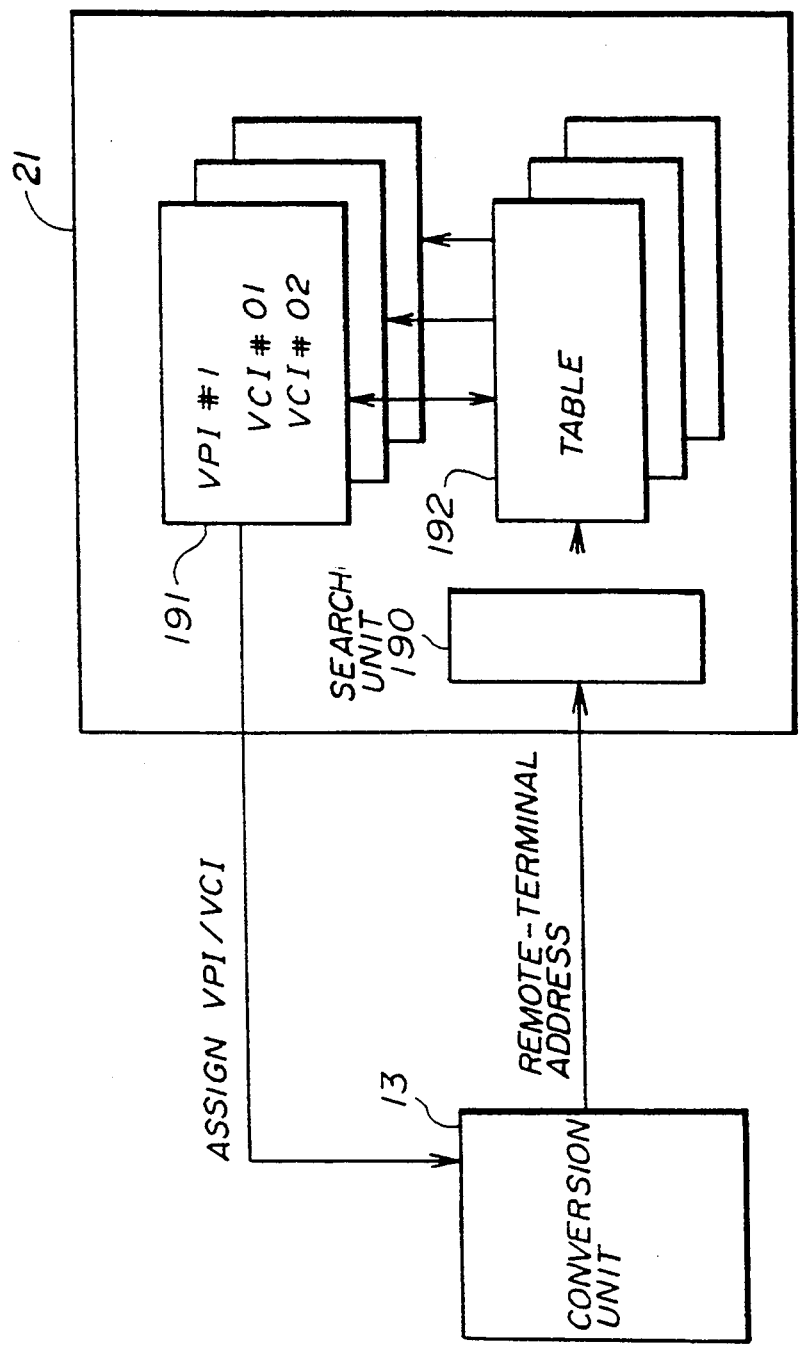
Figure 17:
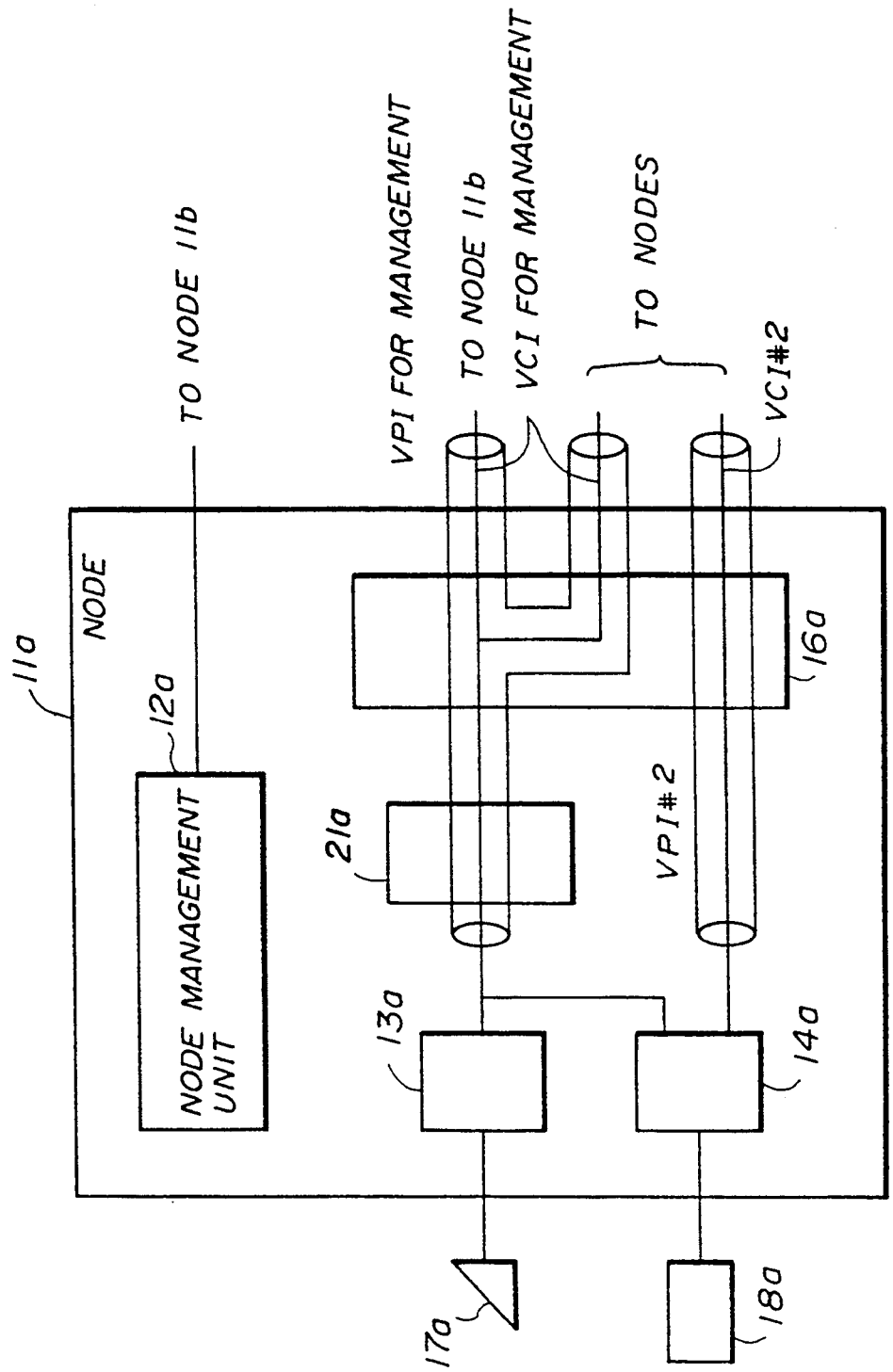
Figure 18:
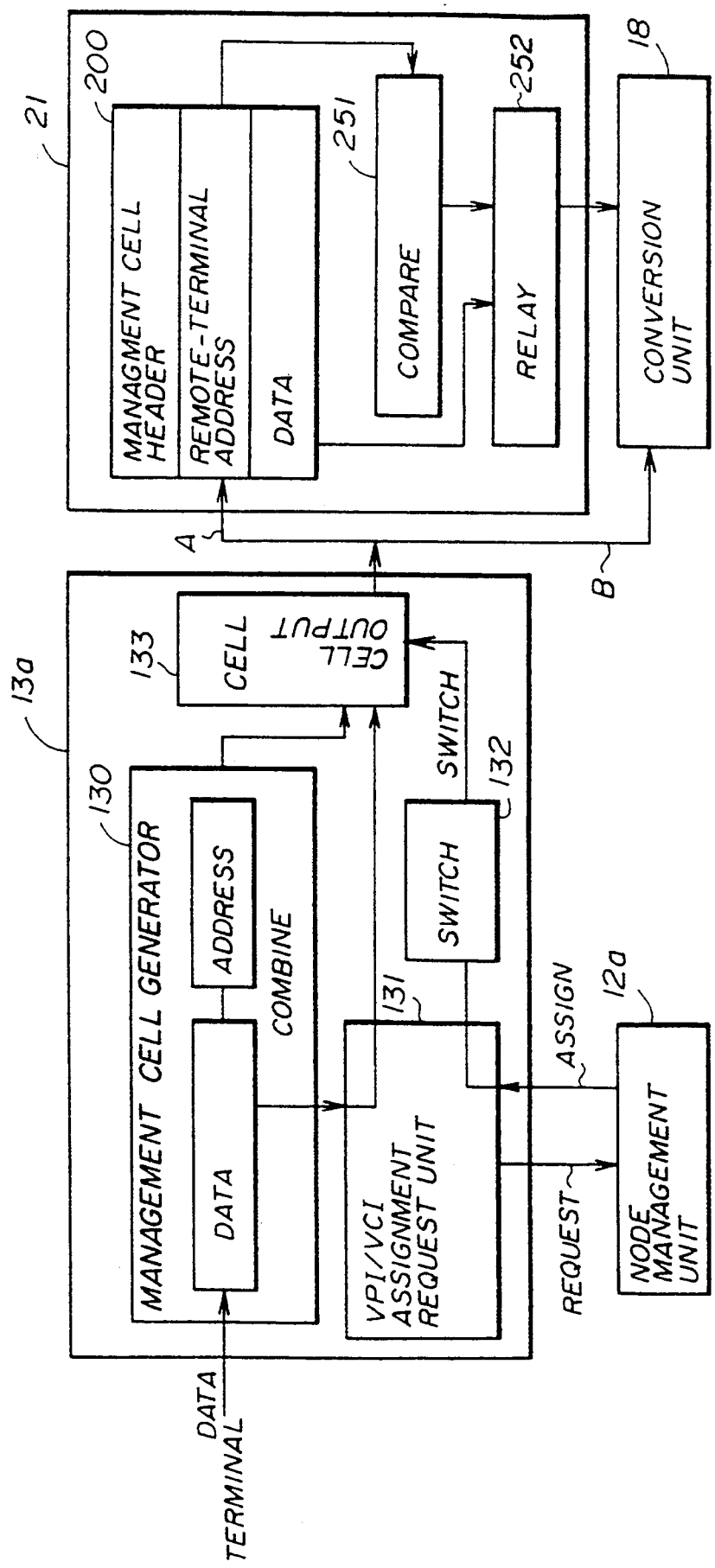
Figure 19:
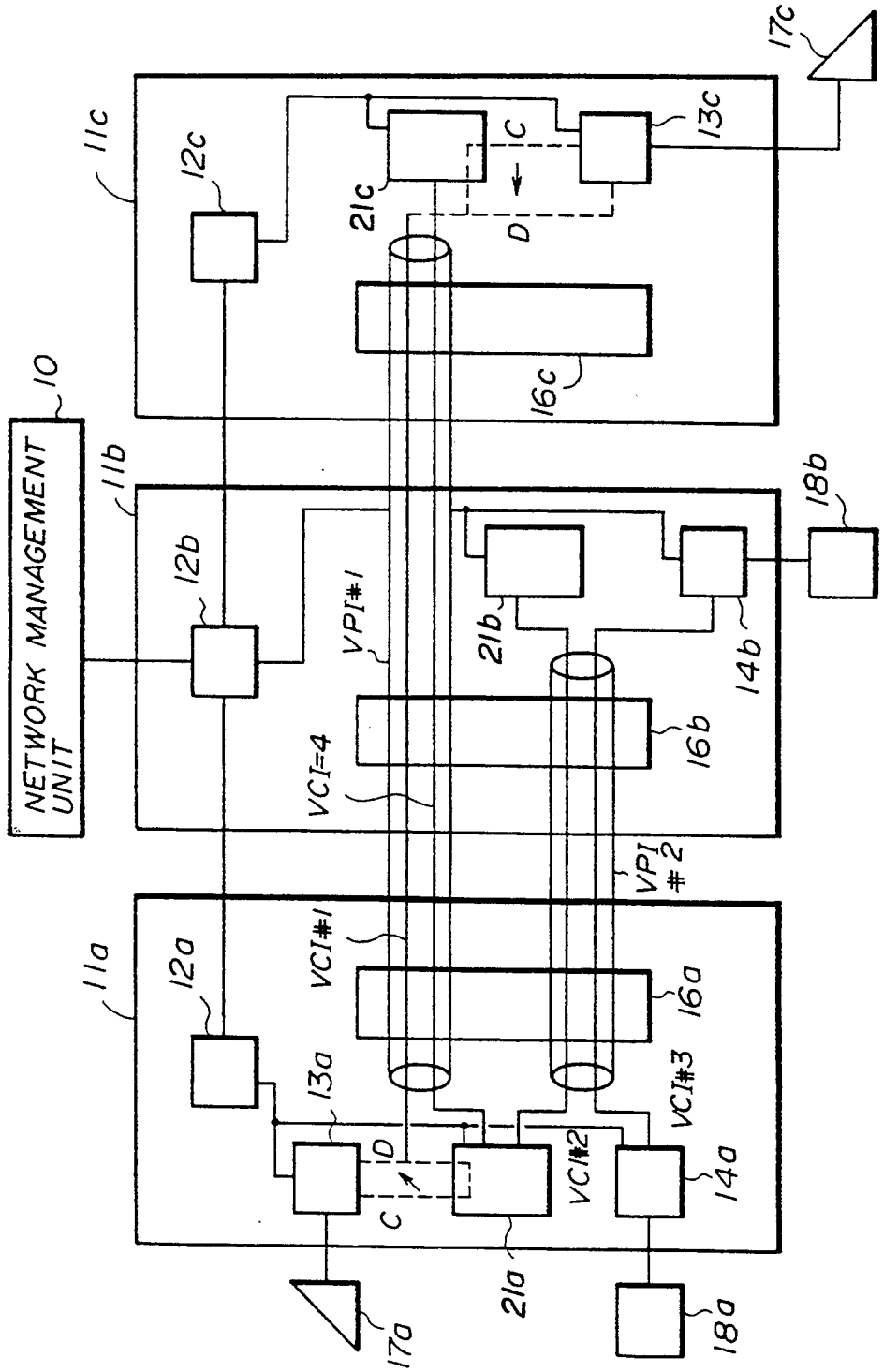

Fig..4 is a block diagram illustrating an overview of a second embodiment of the present invention;

FIG. 5 is a block diagram illustrating an overview of a third embodiment of the present invention;

FIG. 6 is a block diagram showing the details of the first embodiment of the present invention shown in FIG. 3;

FIG. 7 is a diagram showing an HDLC frame format;

FIG. 8 is a block diagram of a conversion unit for use in a data terminal;

FIG. 9 is a block diagram of a conversion unit for use in an audio terminal;

FIG. 10 is a flowchart showing an overview of the operation of the first embodiment shown in FIG. 6;

FIG. 11 is a flowchart of the operation of a VPI/VCI assignment request unit shown in FIG. 8 or FIG. 9;

FIG. 12 is a timing chart showing the operation of the first embodiment of the present invention;

FIG. 13 is a block diagram of a conversion unit used in a second embodiment of the present invention;

FIG. 14 is a flowchart showing the operation of the conversion unit used in the second embodiment of the present invention;

FIG. 15 is a block diagram of a third embodiment of the present invention;

FIG. 16 is a block diagram of a relay unit shown in FIG. 15;

FIG. 17 is a block diagram of a node used in a fourth embodiment of the present invention;

FIG. 18 is a block diagram of a conversion unit and a relay unit used in the fourth embodiment of the present invention;

FIG. 19 is a block diagram of a fifth embodiment of the present invention; and

Figure 20:
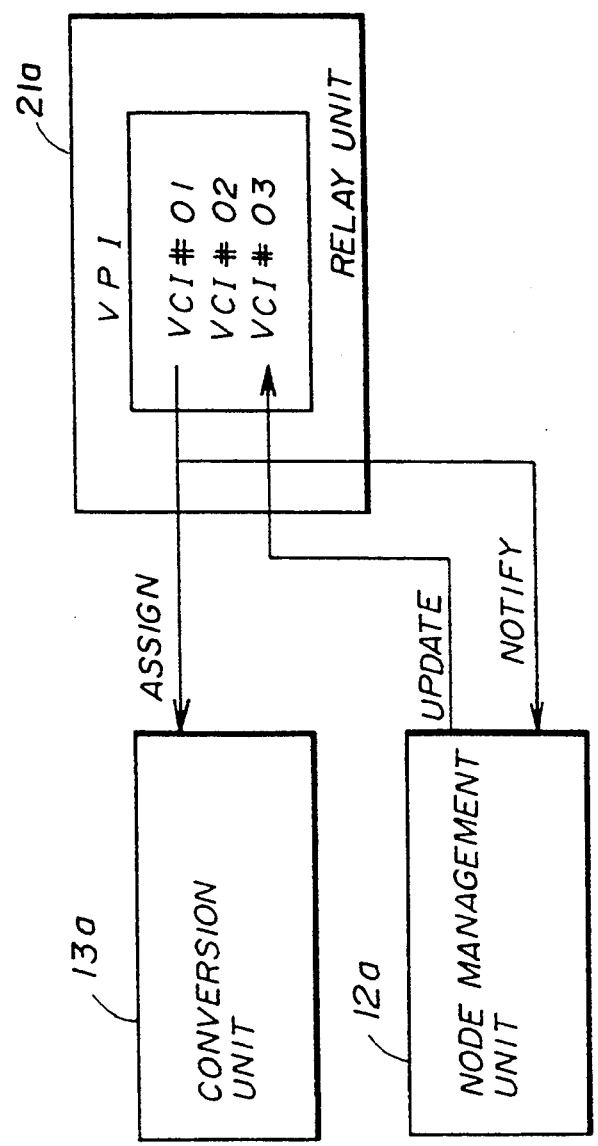

FIG. 20 is a block diagram of a relay unit used in the fifth embodiment of the present invention.

DESCRIPTION OF THE PREFERRED EMBODIMENTS

FIG. 3 shows an overview of a first embodiment of the present invention. A VPI and VCI assignment system according to the first embodiment of the present invention comprises a network management unit 1 having a management table 2, and a node 3 having a node management unit 4, and a conversion (assembly/disassembly) unit 5. The management table 2 stores information indicating VPIs and VCIs already assigned and idle VPIs and VCIs. The node 3 accommodates a high-bit-rate digital transmission line. The conversion unit 5 is connected to a terminal (not shown), and executes an ATM cell assembling and disassembling process.

When the terminal connected to the conversion unit 5 via a subscriber line (not yet used) generates a call, the conversion unit 5 requests the node management unit 4 to assign a VPI and a VPI to the terminal by using a physical address of a remote destination terminal (which is a telephone number of the destination terminal sent from the remote terminal during the calling operation). The node management unit 4 informs the network management unit 1 of the above request. By referring to the management table 2, the network management unit 1 assigns an idle VPI and an idle VCI to the node management unit 4 provided in each node located in a communication route extending to the destination terminal. Further, the network management unit 1 updates the management table 2 and informs the node management unit 4 of the assigned VPI and VCI. The node management unit 4 informs the conversion unit 5 of the VPI and VCI, and the conversion unit 5 generates ATM cells, each having the ATM header including the assigned VPI and VCI sent from the node management unit 4.

When the terminal ends the communication, the conversion unit 5 requests the node management unit 4 and the network management unit 1 via the unit 4 to cancel the assignment of the VPI and VCI. In response to the above request, the node management unit 2 sets the contents of the management table 2 related to the VPI and VCI assigned in response to the call from the terminal to indicate the idle states, and requests the node management units in the nodes located in the route extending to the destination terminal to cancel the setting of the assigned VPI and VCI. In this manner, the setting of the VPI and VCI is canceled, and the present VPI and VCI become idle.

It is possible for the node management unit 4 to hold the VPI and VCI assigned for each call for a predetermined period after communication is terminated. If a call is generated again by the terminal within the predetermined period, the VPI and VCI held in the node management unit 4 is immediately assigned. If there is no call within the predetermined period, the setting of the VPI and VCI is canceled.

Figure 4:
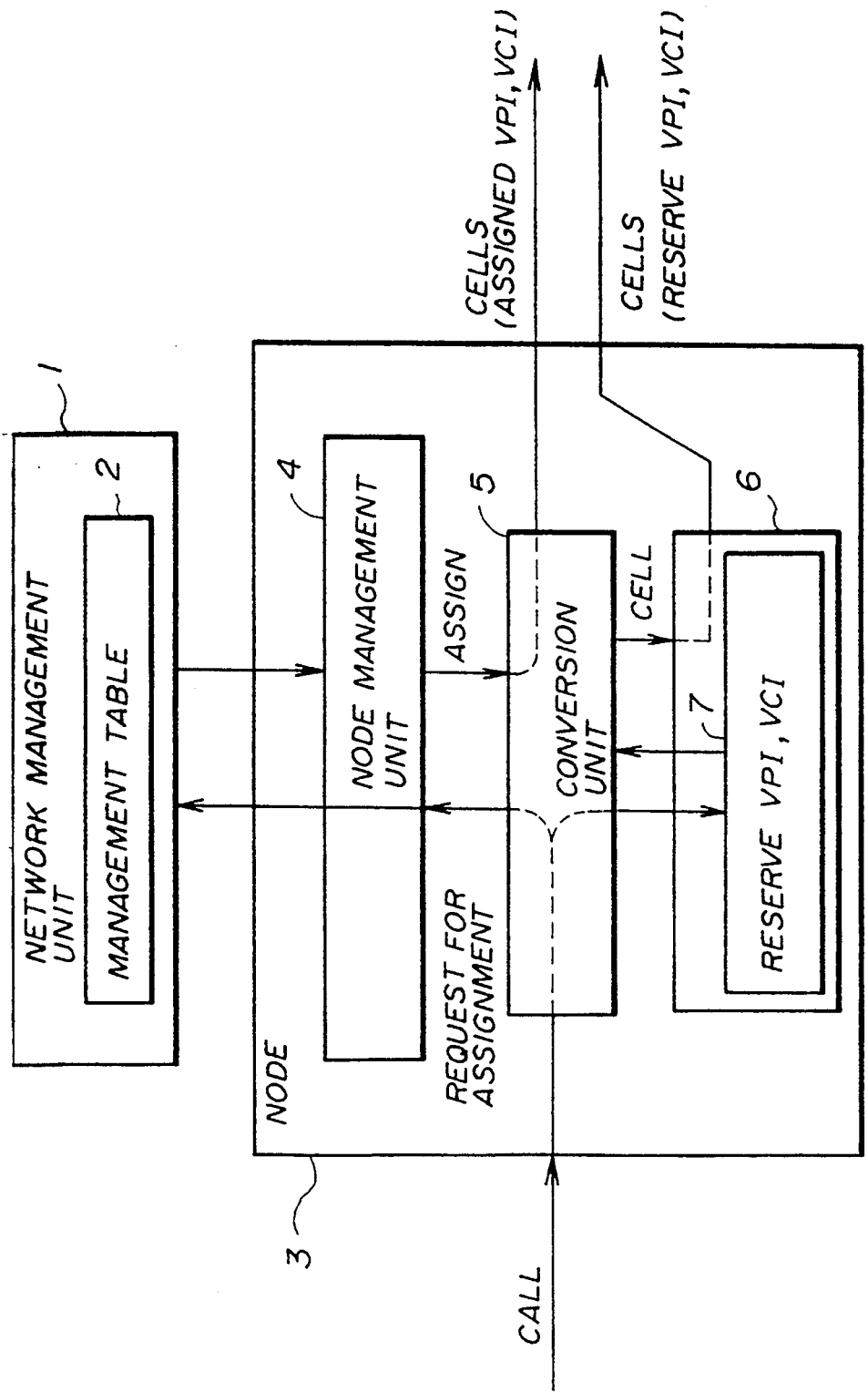

FIG. 4 is a block diagram showing an overview of a second embodiment of the present invention. In FIG. 4, parts that are the same as parts shown in FIG. 3 are given the same reference numbers as previously. A relay unit 6 is provided in the node 3. Each of the other nodes in the ATM system has a relay unit identical to the relay unit 6. A predetermined number of reserve VPIs and a predetermined number of reserve VCIs are assigned to the relay unit 6 beforehand. When a terminal connected to a subscriber line which has not yet been used generates a call and starts a communication, the conversion unit 5 informs the relay unit 6 of the physical address of a destination terminal, and requests the assignment of a pair of VPI and VCI. In response to the above request, the relay unit 6 selects a pair of reserve VPI and VCI from the pairs of reserve VPIs and VCIs, and assigns the selected reserve VPI and VCI to the conversion unit 5. The conversion unit 5 generates ATM cells, each having the ATM header including the assigned VPI and VCI, from data from the terminal. Further, the conversion unit 5 requests the node management unit 4 (and the network management unit 1 via the unit 4) to assign a VPI and a VCI to the conversion unit 5.

When the node management unit 4 assigns an idle VPI and an idle VCI to the conversion unit 5, the conversion unit 5 switches the VPI and VCI from the reserve VPI and VCI to the VPI and VCI assigned by the node management unit 4. Thereby, the reserve VPI and VCI become idle. It is also possible to switch the VCI from the reserve VCI initially assigned to another reserve VCI. It is also possible to continue to use, as a general VPI and a general VCI, the reserve VPI and VCI assigned to the conversion unit and select an idle VPI and an idle VCI as a new reserve VPI and a new reserve VCI.

FIG. 5 shows an overview of a third embodiment of the present invention. In FIG. 5, parts that are the same as parts shown in the previously described figures are given the same reference numbers. A management cell VPI/VCI register 8 is provided in the conversion unit 5 of the node 3. The register 8 stores the VPI and VCI of a management cell used for network management and control and assigned beforehand. Data from the terminal connected to the conversion unit 5 is converted into management cells, each having the VPI and VCI assigned beforehand and having the address of a remote terminal. The node to which the remote terminal is connected receives the management cells, and nodes other than the above node discard the management cells. The conversion unit 5 of the node 3 to which the source terminal is connected requests the node management unit 4 to assign a VPI and a VCI to the conversion unit 5. When a VPI and a VCI have been assigned to the conversion unit 5 by the node management unit 4, the conversion unit 5 switches the transmission medium from the management cells to ATM cells, each having the VPI and VCI assigned by the node management unit 4.

In the first, second and third embodiments of the present invention, it is possible to provide, in the node management unit 4 of each node 3, a management table like the management table 2. In this case, the management tables of the nodes are mutually updated among the nodes.

A description will now be given of the details of the first embodiment of the present invention.

FIG. 6 is a block diagram of an ATM system having a VPI/VCI assignment system according to the first embodiment of the present invention. The ATM system shown in FIG. 6 comprises a network management unit 10, and nodes 11a, 11b and 11c. The node 11a comprises a node management unit 12a, a conversion unit 13a, a conversion unit 14a, an internal bus 15a and a route switching unit 16a. A terminal 17a is connected to the conversion unit 13a, and a modem 18a is connected to the conversion unit 14a. Modem 18a may be provided between terminal 17a and conversion unit 13a, as will be explained below. The internal bus 15a includes a control bus and a data bus. The node 11b comprises a node management unit 12b, a conversion unit 14b to which a modem 18b is connected, an internal bus 15b including a control bus and a data bus, and a route switching unit 16b. The node 11c comprises a node management unit 12c, a conversion unit 13c to which a terminal 17c is connected, and a route switching unit 16c. The terminals 17a and 17c generate frames having an HDLC (High level Data Link Control) format shown in FIG. 7. The HDLC format includes a flag F, a remote-terminal address A, a control field C, an information field I, a frame check sequence field FCS, and another flag F. The terminals 17a and 17c are connected to the node management units 12a and 12c, by means of, for example, an RS232C interface (see EIA or CCITT Recommendations V.24 and V.28). Each of the modems 18a and 18b modifies the amplitude or phase of a carrier signal in accordance with an input signal (analog modulation), and generates a digital signal from a modulated signal received.

Each of the conversion units 13a, 13c, 14a and 14b has the functions of detecting start of transmission and notifying the other nodes of the remote terminal. The node management unit 12a has a VPI/VCI management table (not shown in FIG. 6), and a VPI/VCI assignment function. It is possible to provide VPI/VCI management table in the network management unit 10 in the same manner as shown in FIG. 3.

FIG. 8 is a block diagram of a transmission part of the conversion unit 13a shown in FIG. 6. The conversion unit 13a, to which the terminal 17a, such as a personal computer or a CAD/CAM, is connected, comprises a terminal interface matching unit 201, a buffer 202, an RS (Request-to-Send) signal detector 203, a remote-terminal address detector 204, a cell assembling unit 205, a cell sender unit 206, a VPI/VCI assignment request unit 207, and an internal bus 208. The cell assembling unit 205 comprises an AAL (ATM Adaptation Layer) generator 205a an ATM header generator 205b, and a cell assembly device 205c. The 48-byte information field of each ATM cell contains information in the ATM adaptation layer. The AAL generator 205a stores information including an assembly condition dependent on the characteristics of the media (such as data, voice and images). For example, the AAL generator 205a reads send data SD stored in the buffer 202 sent from the data terminal in a unit of 44 octets, and generates an 48-octet AAL data including the 4-byte assembly condition. The ATM header generator 205b generates an ATM header, which includes information showing the VPI, VCI, CT (payload type), CLP (Cell Loss Priority), and HEC (Header Error Check).

The VPI/VCI assignment request unit 207 comprises a VPI/VCI assignment request block 207a, an address memory 207b, a VPI/VCI memory 207c, and an interface unit 207d. The VPI/VCI assignment request block 207a sends an assignment request to the node management unit 12a when the RS signal detector 203 detects that a request-to-send signal is ON. The block 207a sends an assignment cancel request to the node management unit 12a when the detector 203 detects the request-to-send signal is OFF. The address memory 207b stores the address of the data terminal connected to the conversion unit 14a and the address of the remote terminal, the latter address being detected by the remote-terminal address detector 204. The interface unit 207d, which can be a parallel or serial interface, establishes an interface between the conversion unit 13a and the node management unit 12a. It will be noted that a reception part of the node 11a is omitted because it has a conventional configuration and is not directly related to the present invention.

FIG. 9 is a block diagram of a transmission part of the conversion unit 14a to which the audio terminal 19a, such as a telephone set, a facsimile machine, an analog exchange or a PBX, is connected via the modem 18a. The conversion unit 14a comprises a terminal interface matching unit 221, a coder unit 222, an on-hook/off-hook detection unit 223, a dial number detection unit 224, a cell assembling unit 225, a cell sender unit 226, a VPI/VCI assignment request unit 227, and an internal bus 228. The cell assembling unit 225 comprises an AAL generator 225a, an ATM header generator 225b, and a cell assembling device 225c in the same manner as the cell assembling unit 205 shown in FIG. 8. The VPI/VCI assignment request unit 227 comprises a VPI/VCI assignment request unit 227a, an address memory 227b, a VPI/VCI memory 207c, and an interface unit 227d in the same manner as the VPI/VCI assignment request unit 207.

The coder unit 222 encodes a voice signal sent from the terminal via the terminal interface matching unit 221. The coder unit 222 includes an analog-to-digital conversion function (64kbps PCM data). The dial number detection unit 224 detects a dial number sent from the terminal by signaling when the dial number is sent in the form of dial pulses. Further, the unit 224 detects the dial number by an audio signal when it is expressed by a combination of a plurality of frequency signals (push button). The addresses of the source terminal and the remote terminals are respectively dial numbers.

A description will now be given, with reference to FIGS. 10–12, of the operation of the first embodiment of the present invention. FIG. 10 is a flowchart of a basic operation of the first embodiment, and FIG. 11 is a flowchart of the operation of the VPI/VCI assignment request block 207a. FIG. 12 is a timing chart of the operation of the first embodiment of the present invention.

It will now be assumed that the data terminal 17a connected to the node 11a (via the modem 18a) generates a call. The terminal 17a turns ON the RS (Request-to-Send) signal conforming to the RS232C interface, so that the RS signal is switched to a high (H) level (step S101 in FIG. 10). The RS detector 203 detects the RS signal, and informs the VPI/VCI assignment request block 207a of the above fact (steps S102, S121). The block 207a sends a VPI/VCI assignment request signal to the node management unit 12a by setting the signal level thereof to the high level (steps S102, S122). The remote-terminal address detection unit 204 detects the address of a remote terminal 17c connected to the node 11c, and writes it into the address memory 207b (steps S102, S123). The address of the remote terminal 17b is transferred to the node management unit 12a (step S124). The node management unit 12a assigns an idle VPI and an idle VCI to the terminal 17a, and informs the other nodes located in a route connected to the destination terminal of the assigned VPI and VCI (steps S103, S125). At this time, the assignment status signal of the conversion unit 13a is set to the high level. If the network management unit 10 has the VPI/VCI assignment function, the node management unit 12a requests the network management unit 10 to assign a VPI and VCI at step S103, and the network management unit 10 assigns a VPI and a VCI at step S104. Further, the network management unit 10 informs the nodes of the assigned VPI and VCI at step S104.

Referring to FIG. 12, the conversion unit 13c stores the VPI and VCI sent from the node management unit 12b in the VPI/VCI register 207c, and sets the assignment status signal to the high level. Then, a CD-on cell is transmitted from the conversion unit 13c. Further, a CD (Clear-to-Send) signal conforming to the RS232C interface is maintained at the high level for a predetermined time, and thereby the terminal 17c is informed that the call is received. In this manner, a communication path between the terminal 17a and the remote terminal 17c is established (step S105).

The conversion unit 13a connected to the node 11a receives the CD-on cell, and sends the terminal 17a a CD signal. The terminal 17a sends SD data having the HDLC format to the cell assembling unit 205 of the conversion unit 13a via the terminal interface matching unit 201 and the buffer 202. The cell assembling unit 205 generates ATM cells, each having the ATM header into which the assigned VPI and VCI are written. The ATM cells from the node 11a are received by the node 11c. The node 11c disassembles the received ATM cells into data having the HDLC format, and sends received data RD to the terminal 17c.

The terminal 17a sets the RS signal to a low (L) level when data transmission is completed (step S106). The RS detector 203 of the conversion unit 13a of the node 11a detects the above level change, and informs the VPI/VCI assignment request block 207a of the above detection result (step S126). The block 207a cancels a VPI/VCI assignment request to the node management unit 12a by temporarily setting a corresponding trigger signal line to the high level (steps S107, S127). The node management unit 12a sets the specified VPI and VCI stored therein to the idle states (steps S108, S128). Then, the node management unit 12a notifies the node management unit 12b of the node 11b of the cancellation of the assignment of the specified VPI and VCI by temporarily setting a corresponding trigger signal to the high level. In response to the above, the node management unit 12b temporarily sets a corresponding trigger signal line to the high level. In response to the above level change, the setting of the VPI and VCI to the conversion unit 13c is canceled, and the corresponding signal line is switched to the low level. Then, the CD signal is set to the low level. Further, the network management unit sets the specified VPI and VCI stored in the management table 2 to the idle state. In response to the one-shot pulse indicating the cancellation of the assignment generated by the node management unit 12a, the conversion unit 13a sets the assignment status signal to the low level, and the CS signal is turned OFF (set to the low level).

Communications between the terminals 19a and 19a take place in the same manner as described above. In this case, the ON/OFF states of the RS signals correspond to off-hook and on-hook, respectively.

A description will now be given, with reference to FIGS. 13 and 14, of the details of the second embodiment of the present invention shown in FIG. 4. The second embodiment of the present invention includes a timer added to the configuration of the first embodiment of the present invention. The timer operates by starting when communication between the calling terminal and the called terminal is terminated, and measures a predetermined period. The VPI and VCI are held for the predetermined period. If the previous calling terminal generates a call again within the predetermined period, the held VPI and VCI are immediately assigned. If the previous calling terminal does not generate a call within the predetermined period, the held VPI and VCI are canceled.

FIG. 13 shows the hardware structure of each of the conversion units 13a, 13c, 14a and 14b provided in the nodes 11a, 11b and 11c. The conversion unit shown in FIG. 13 includes a communication end detector 60, a communication start detector 61, a clock source 62, a counter 63, a register 64, a VPI/VCI assignment cancel request generator 65, a VPI/VCI assignment request generator 66, and an internal bus 67. The detectors 60 and 61 correspond to the RS detector 203 shown in FIG. 8, and the generators 65 and 66 correspond to the VPI/VCI assignment request block 207a. The internal bus 67 corresponds to the internal bus 208 shown in FIG. 8.

The communication end detector 60 detects the switching of the RS signal from ON to OFF or on-hook, and outputs a counter load signal to the counter 63. In response to the counter load signal, a count value registered in the register 64 is loaded to the counter 63. The counter 63 increments its count value in synchronism with a clock signal generated by the clock source 62. When the count value has become equal to a predetermined value corresponding to the aforementioned predetermined period, the counter 63 outputs a trigger signal to the VPI/VCI assignment cancellation request generator 65, which requests the node management unit 12a to cancel the assignment of the VPI and VCI via the internal bus 67. When the communication start detector 61 detects the switching of the RS signal from OFF to ON or the off-hook signal, the unit 61 outputs a reset signal to the counter 63. In response to the reset signal, the counter 63 is reset, and generation of the assignment cancellation request is suppressed. The trigger signal generated by the unit 61 is also applied to the VPI/VCI assignment request generator 66, which requests the node management unit 12a to assign the VPI and VCI to the call.

FIG. 14 is a flowchart of a sequence executed by the conversion unit 14a having a built-in microcomputer, which is substituted for the elements 62–66 shown in FIG. 13. The microcomputer receives an interrupt signal (corresponding to the aforementioned load signal) form the communication end detector 60, and starts a sub-routine (step S131). The microcomputer reads the timer value of a built-in timer (step S132), and determines whether or not the timer value has become equal to '0' (step S133). When the result of the above determination is NO, the microcomputer subtracts a predetermined value from the current timer value (step 134), and executes step S133 again. The steps S133 and 134 are repeatedly performed until the result of the step S133 determination becomes YES. Then, the microcomputer requests the node management unit 12a to cancel the assignment of the VPI and VCI (step S136), and ends the execution of the sub-routine. If the switching of the RS signal from OFF to ON or on-hook is detected by the unit 61 while the sub-routine is being processed, the microprocessor immediately executes step S136. The sub-routine shown in FIG. 14 is indicated as step S110 in FIG. 10.

A description will now be given, with reference to FIGS. 15 and 16, of a third embodiment of the present invention. In FIGS. 15 and 16, parts that are the same as parts shown in the previously described figures are given the same reference numbers. The third embodiment of the present invention is the same as the first embodiment except that the nodes 11a, 11b and 11c have route switching units 16a, 16b and 16c, and relay units 21a, 21a and 21c, respectively. The nodes 11a, 11b and 11c respectively have reserve VPIs and VCIs corresponding to the paths (routes).

When the terminal 17a calls the terminal 17c, the conversion unit 13a outputs the physical address of the called terminal 17c to the relay unit 21a, which selects a pair of reserve VPI and VCI related to a route extending to the terminal 17c. In the example illustrated in FIG. 15, VPI#1 and VCI#1 are selected and output to the conversion unit 13a. Further, the VPI#1 and VCI#1 are supplied to the route switching unit 16a, which generates ATM cells, each having the physical address of the called terminal 17c. Since the reserve VPI and VCI included in the ATM cells have been assigned to the conversion unit 13a, the ATM cells are transferred from the route switching unit 16a to the relay unit 21c via the route switching units 16b and 16c. The above route is indicated as A.

The relay unit 21c assigns the VPI#1 and VCI#1 to the conversion unit 13c by referring to the address of the source terminal 17a contained in the first received ATM cell. In response to receipt of the subsequent ATM cell having the address of the terminal 17c, the relay units 21a and 21c inform, via the node management units 12a and 12c, the network management unit 10 that the reserve VPI and VCI have become busy. The network management unit 10 selects a VPI and a VCI from among idle VPIs and VCIs (which are not reserve VPIs and VCIs). In the example shown in FIG. 15, idle VPI#4 and VCI#4 are selected. The network management unit 10 assigns the VPI#4 and VCI#4 to each of the route switching units 16a, 16b and 16c, and then assigns the VPI#4 and VCI#4 to each of the conversion units 13a and 13c. Hence, the conversion units 13a and 13c start to communicate with each other via a route B corresponding to the VPI#4 and VCI#4. At this time, the reserve VPI#1 and VCI#1 are also used, and an instantaneous signal break because of switching does not occur. Then, the assignment of the VPI#1 and VCI#1 with respect to each of the conversion units 13a and 13c is canceled.

FIG. 16 shows the structure of a relay unit 21 corresponding to each of the relay units 21a, 21b and 21c. The relay unit 21 comprises a search unit 190, reserve VPI/VCI tables 191, and remote-terminal address tables 192. The conversion unit 13 sends the address of the remote terminal to the search unit 190, which searches the tables 192, and selects a VPI and a VCI corresponding to the remote-terminal address. Then, one of the tables 191, which are provided for the respective VPIs, is selected by using the selected VCI, and an idle VCI is selected from among idle VCIs defined in the selected table 191. Then, the selected VPI and VCI are supplied to the conversion unit 13.

A description will now be given, with reference to FIGS. 17 and 18, of a fourth embodiment of the present invention. In FIGS. 17 and 18, parts that are the same as parts shown in the previously described figures are given the same reference numbers. As has been described previously, a management cell having a VPI and a VCI for use in network management and control is used. FIG. 17 shows that the conversion unit 13a has VPIs and VCIs for use in network management and control, provided for routes to the nodes 11b and 11c.

FIG. 18 is a block diagram of the conversion unit 13a and a relay unit 20 provided in a route extending to a remote terminal. The conversion unit 13a comprises a management cell generator 130, a VPI/VCI assignment request unit 131, a switching unit 132, and a cell output unit 133. The VPI/VCI assignment request unit 131 corresponds to the unit 207 shown in FIG. 8. The switching unit 132 and the cell output unit 133 correspond to the cell assembly unit 205 and the cell sender unit 206 shown in FIG. 8. The management cell generator 130 corresponds to the elements 202–204 shown in FIG. 8. The configuration shown in FIG. 18 corresponds to the configuration shown in FIG. 8 in the same manner as the above.

A communication starts, and data from the terminal 17a connected to the conversion unit 13a is applied to the management cell generator 130. The management cell generator 130 generates a management cell including data, and the VPI and VCI for use in network management and control. The VPI/VCI assignment request unit 131 requests the node management unit 12a to assign a VPI and a VCI to the conversion unit 13a. The management cells are sent to the relay unit 21 immediately after the terminal 17a starts to send data to the conversion unit 13a. Hence, the time taken for the VPI and VCI to be assigned by the node management unit 12a is not wasted.

The management cells from the conversion unit 13a are successively received by the relay unit 21 via a route A. The ATM header of the management cell, the remote-terminal address and data contained in each of the management cells are stored in a buffer 200. A comparator unit 251 compares the address of the node having the relay unit 21 stored therein with the remote-terminal address in the buffer 200. When it is determined that the remote-terminal address includes information specifying the node having the relay unit 21, the comparator unit 251 specifies a corresponding one of the conversion units (for example, conversion unit 13c). Thereby, data is read from the buffer 200 and relayed to a conversion unit 18 via a cell relay block 252. If the addresses do not coincide with each other, the management cell is discarded.

The management cell (including the management cell header, the remote-terminal address, and data) from the cell relay block 252 is received by the conversion unit 18, and is sent to the remote terminal connected to the conversion unit 18.

The unit 131 is informed of the assigned VPI and VCI from the node management unit 12a, it generates ATM cells, each having the assigned VPI and VCI and data from the terminal, and sends them to the cell output unit 133. The switching unit 132 operates in response to the notification of the VPI/VCI assignment by means of the node management unit 12a, and causes the cell output unit 133 to select the ATM cells from the unit 131. Thereby, the ATM cells from the unit 131 are sent to the relay unit 21 in lieu of the management cells. The relay unit 21 does not operate in response to the ATM cells from the conversion unit 130, while these ATM cells are sent to the conversion unit 18 via a route B.

A description will now be given, with reference to FIGS. 19 and 20, of a fifth embodiment of the present invention. In FIGS. 19 and 20, parts that are the same as parts shown in the previously described figures are given the same reference numbers. The fifth embodiment corresponds to a variation of the third embodiment shown in FIG. 15. In the third embodiment, reserve VPI#1 and VCI#1 are assigned, and thereafter an idle VPI and an idle VCI are assigned in lieu of the reserve VPI#1 and VCI#1. In the fifth embodiment, the reserve VPI#1 and VCI#1 respectively assigned to the relay units 21a and 12c are assigned to the conversion unit 13a and the conversion unit 13c, respectively. Thereby, a route C is established and thereafter the network management unit 10 cancels the assignment of the VCI#1 to the relay units 21a and 21c after a predetermined time. Then, the network management unit 10 switches to a route D (via VCI#1) extending from the conversion unit 13a to the conversion unit 13c, and assigns the relay units 21a and 21c to VCI#4 as a reserve VCI.

A reserve route defined by the VPI#1 and VCI#4 is assigned to communication which takes place after VCI#4 is assigned to the conversion units as a reserve VCI, and another reserve VCI is assigned to the relay units.

As shown in FIG. 20, the relay unit 19a has an update unit, which assigns a reserve VPI and a VCI to the conversion unit 13a and thereafter informs the node management unit 12a of the conversion unit to which the reserve VPI and VCI are assigned, and the assigned VCI. The node management unit 12a selects an idle VPI and an idle VCI, and substitutes this idle VCI for the reserve VCI stored in the relay unit 21a. That is, the VCI which has been assigned to the conversion unit 13a is canceled, and the new idle VCI is registered in the relay unit 21a. It will be noted that a path connected to the relay unit to which the destination terminal is connected has been established, and the above relay unit identifies one of the conversion units provided therein by referring to the remote-terminal address, and assigns the VPI and VCI to the identified conversion unit.

The present invention is not limited to the specifically described embodiments, and variations and modifications may be made without departing from the scope of the invention.

What is claimed is:

1. A channel assignment system in combination with a network having a plurality of nodes and a plurality of terminals, each of the nodes including a conversion unit which generates fixed-length cells, including channel identification and data, from data sent from one of the terminals, and a node management unit which manages a corresponding node, said channel assignment system comprising:

management means for assigning virtual channels to calls and managing information concerning virtual channels currently assigned to the calls and idle virtual channels;

assignment requesting means, provided in each of the nodes and connected to said management means, for requesting said management means to assign an idle virtual channel to a call received from one terminal of the plurality of terminals;

channel identification set means for setting channel identification of the cells based on the idle virtual channel; and assignment cancelling means, provided in each of the nodes and connected to said management means, for requesting said management means to set said virtual channel assigned to said call in an idle state in response to an end of a communication related to said call.

2. The channel assignment system as claimed in claim 1, further comprising time means, coupled to said assignment cancelling means provided in each of the nodes, for measuring a predetermined period after the end of the communication and for causing said assignment cancelling means to request said management means to set said virtual channel in the idle state after the predetermined period when no call is received from said one terminal of the plurality of terminals within said predetermined period.

3. The channel assignment system as claimed in claim 2, further comprising time reset means, coupled to said assignment cancelling means provided in each of the nodes, for resetting said time means when another call is received from said one terminal of the plurality of terminals within said predetermined period.

4. The channel assignment system as claimed in claim 1, wherein said assignment requesting means comprises means for selecting one of the idle virtual channels in response to a call from said one terminal of the plurality of terminals.

5. The channel assignment system as claimed in claim 1, further comprising:
relay units respectively provided in the nodes, the relay units selectively connecting conversion units in said nodes to transmission paths connecting adjacent nodes to each other, reserve virtual channels being assigned to the relay units;
control means for starting a transfer of fixed-length cells via the relay units using one of the reserve virtual channels in response to the call from said one terminal of the plurality of terminals and for requesting said assignment requesting means to assign one of the idle virtual channels; and
switching means for switching the transfer of the fixed-length cells from a first route defined by said one of the reserve virtual channels to a second route defined by said one of the idle virtual channels.

6. The channel assignment system as claimed in claim 1, further comprising:
control means for starting, in response to the call from said one of the terminals, a transfer of management cells, each having data from said one terminal of the plurality of terminals and a specific identifier for use in network management and control and for requesting said assignment requesting means to assign one of the idle virtual channels; and
switching means for switching a transfer of data from said one terminal of the plurality of terminals from the transfer of the management cells to a transfer of fixed-length cells.

7. The channel assignment system as claimed in claim 1, further comprising:
relay units respectively provided in the nodes, the relay units selectively connecting the conversion units to transmission paths connecting adjacent nodes to each other, reserve virtual channels being assigned to the relay units;
first control means for starting a transfer of fixed-length cells via the relay units using one of the reserve virtual channels in response to the call from said one terminal of the plurality of terminals and for requesting said assignment requesting means to assign one of the idle virtual channels; and
second control means for designating said one of the reserve virtual channels as an idle virtual channel after the end of the communication and for designating one of the idle virtual channels as a reserve channel after the end of the communication.

8. The channel assignment system as claimed in claim 1, wherein said management means includes a network management unit which manages and controls said network.

9. The channel assignment system as claimed in claim 8, wherein said node management units of said nodes respectively managing the nodes function as interfaces between said network management unit and the nodes.

10. The channel assignment system as claimed in claim 1, wherein said management means is provided in common with said nodes.

11. The channel assignment system as claimed in claim 1, wherein said management means is provided in each of said nodes.

12. The channel assignment system as claimed in claim 8, wherein said management means comprises a table storing information concerning virtual channels currently assigned to the calls and idle virtual channels, said table being provided in said network management unit.

13. The channel assignment system as claimed in claim 9, wherein said node management units comprise tables respectively storing information concerning virtual channels currently assigned to the calls and idle virtual channels.

14. The channel assignment system as claimed in claim 1, wherein the terminals comprise audio terminals.

15. The channel assignment system as claimed in claim 1, wherein the terminals comprise data terminals.

* * * * *